(12) United States Patent
Tsuji et al.

(10) Patent No.: US 10,180,143 B2
(45) Date of Patent: Jan. 15, 2019

(54) METHOD OF MANUFACTURING TURBOCHARGER AND TURBOCHARGER

(71) Applicant: Mitsubishi Heavy Industries, Ltd., Tokyo (JP)

(72) Inventors: Takeshi Tsuji, Nagasaki (JP); Yoshihisa Ono, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/787,658

(22) PCT Filed: Feb. 23, 2015

(86) PCT No.: PCT/JP2015/054930
§ 371 (c)(1),
(2) Date: Oct. 28, 2015

(87) PCT Pub. No.: WO2015/133303
PCT Pub. Date: Sep. 11, 2015

(65) Prior Publication Data
US 2016/0369817 A1 Dec. 22, 2016

(30) Foreign Application Priority Data

Mar. 4, 2014 (JP) ................................. 2014-042073

(51) Int. Cl.
*H02K 1/18* (2006.01)
*H02K 7/14* (2006.01)
(Continued)

(52) U.S. Cl.
CPC ........... *F04D 25/045* (2013.01); *F01D 15/10* (2013.01); *F04D 17/10* (2013.01); *F04D 25/024* (2013.01);
(Continued)

(58) Field of Classification Search
CPC ..................... F01D 15/10; H02K 5/20; H02K 1/2706–1/272; H02K 15/02; H02K 15/03;
(Continued)

(56) References Cited

U.S. PATENT DOCUMENTS 3,165,816 A * 1/1965 Wightman ............. H02K 15/16
29/596
3,268,986 A * 8/1966 Lacy ...................... H02K 15/16
29/423

(Continued)

FOREIGN PATENT DOCUMENTS

EP 1376826 A2 1/2004
EP 1961936 B1 8/2008
(Continued)

OTHER PUBLICATIONS

Notification Concerning Submission, Obtention or Transmittal of Priority Document, App. No. PCT/JP2015/054930, Filed Feb. 23, 2015, dated Apr. 9, 2015, 1 Page.

(Continued)

*Primary Examiner* — Alexander B Comley
(74) *Attorney, Agent, or Firm* — Berkeley Law & Technology Group, LLP (57) ABSTRACT

A method of manufacturing a turbocharger which allows easy performance of assembly operations of a motor rotor and a stator in a motor overhang structural turbocharger is provided. In a method of manufacturing a turbocharger in which a motor is attached to an end portion of a rotor shaft (15) connected to a compressor portion, the motor includes a cylindrical housing (33), a stator (32) accommodated inside the housing (33), and a motor rotor (31) which is connected to an end portion of the rotor shaft (15) with permanent magnets rotating inside the stator (32), and the method includes a rotor installation step of connecting and attaching the motor rotor (31) to the rotor shaft (15), a (Continued)

housing installation step of fixing and supporting the housing (33) coaxial to the rotor shaft (15), and a stator installation step of using the housing (33) as a guide, and inserting the stator (32) into the housing (33) such that the stator (32) does not directly come into contact with the motor rotor (31) to incorporate the stator (32) into the housing (33).

6 Claims, 10 Drawing Sheets (51) Int. Cl.
| | |
|---|---|
| F01D 15/10 | (2006.01) |
| F02B 37/10 | (2006.01) |
| F02B 39/10 | (2006.01) |
| F04D 17/10 | (2006.01) |
| F04D 25/02 | (2006.01) |
| F04D 25/04 | (2006.01) |
| F04D 25/06 | (2006.01) |
| F04D 29/20 | (2006.01) |
| F04D 29/26 | (2006.01) |
| F04D 29/62 | (2006.01) |
| H02K 15/02 | (2006.01) |
| H02K 15/03 | (2006.01) |
| H02K 15/16 | (2006.01) |

(52) U.S. Cl.
CPC ......... *F04D 25/06* (2013.01); *F04D 25/0606* (2013.01); *F04D 29/20* (2013.01); *F04D 29/266* (2013.01); *F04D 29/624* (2013.01); *H02K 15/02* (2013.01); *H02K 15/03* (2013.01); *H02K 15/16* (2013.01); *F02B 37/10* (2013.01); *F02B 39/10* (2013.01); *F05B 2220/40* (2013.01); *F05B 2230/60* (2013.01); *F05B 2240/60* (2013.01); *F05D 2220/40* (2013.01); *F05D 2230/60* (2013.01); *H02K 1/185* (2013.01); *H02K 7/14* (2013.01); *Y02T 10/144* (2013.01)

(58) Field of Classification Search
CPC .......... H02K 15/14; H02K 15/16; F02C 6/12; F04D 25/04–25/045; F04D 17/10; F04D 25/06; F04D 25/024; F04D 25/0606; F04D 29/20; F04D 29/266; F04D 29/624
USPC ..... 29/732, 596, 598, 889.2–889.23; 60/607, 60/608; 310/89, 113
See application file for complete search history.

(56) References Cited

U.S. PATENT DOCUMENTS

| 3,605,257 | A | * | 9/1971 | McMahon | H02K 15/16 29/596 |
|---|---|---|---|---|---|
| 5,767,596 | A | * | 6/1998 | Stark | H02K 5/00 29/596 |
| 6,305,169 | B1 | * | 10/2001 | Mallof | F01D 15/10 60/608 |
| 6,321,439 | B1 | * | 11/2001 | Berrong | H02K 1/185 264/272.2 |
| 6,735,945 | B1 | * | 5/2004 | Hall | F01D 15/10 123/565 |
| 6,739,845 | B2 | * | 5/2004 | Woollenweber | F01D 15/10 384/448 |
| 7,353,586 | B2 | * | 4/2008 | Majernik | H02K 1/185 29/50 |
| 7,559,751 | B2 | * | 7/2009 | Shibui | F02B 37/10 123/383 |
| 8,237,316 | B2 | | 8/2012 | Bischof | |
| 2004/0051415 | A1 | | 3/2004 | Hamamura et al. | |
| 2004/0200215 | A1 | | 10/2004 | Woollenweber et al. | |
| 2005/0193738 | A1 | * | 9/2005 | Hayasaka | F02C 3/05 60/726 |
| 2008/0115347 | A1 | * | 5/2008 | Majernik | H02K 1/185 29/732 |
| 2008/0203732 | A1 | | 8/2008 | Ono et al. | |
| 2008/0236261 | A1 | * | 10/2008 | Ono | F01D 25/285 73/112.01 |
| 2009/0174267 | A1 | | 7/2009 | Bischof | |
| 2009/0241542 | A1 | * | 10/2009 | Ono | F01D 25/16 60/624 |
| 2009/0308591 | A1 | | 12/2009 | Shen et al. | |
| 2011/0025144 | A1 | * | 2/2011 | Schartman | H02K 5/20 310/54 |
| 2011/0273045 | A1 | | 11/2011 | Vuolle-Apiala et al. | |
| 2013/0142636 | A1 | | 6/2013 | Parker | |
| 2013/0220285 | A1 | * | 8/2013 | Hayashi | F02B 37/10 123/565 |
| 2014/0090626 | A1 | * | 4/2014 | An | H02K 5/1732 123/565 |
| 2014/0139058 | A1 | * | 5/2014 | Wei | H02K 5/20 310/59 |
| 2014/0190001 | A1 | * | 7/2014 | Jaszcar | H02K 15/024 29/596 |

FOREIGN PATENT DOCUMENTS

| EP | 2385614 | A1 | 11/2011 |
|---|---|---|---|
| GB | 2497113 | A | 6/2013 |
| JP | 4247217 | B2 | 4/2009 |
| JP | 4648347 | B2 | 3/2011 |
| JP | 2012177330 | A | 9/2012 |
| JP | 2012197684 | A | 10/2012 |
| JP | 2012229676 | A | 11/2012 |
| JP | 2013024059 | A | 2/2013 |
| JP | 2015017536 | A | 1/2015 |
| KR | 20100102687 | A | 9/2010 |
| KR | 20100117063 | A | 11/2010 |
| WO | 2005124121 | A1 | 12/2005 |
| WO | 2013011839 | A1 | 1/2013 |
| WO | 2015133303 | A1 | 9/2015 |

OTHER PUBLICATIONS

Written Opinion of the International Searching Authority & International Search Report, App. No. PCT/JP2015/054930, Filed Feb. 23, 2015, dated Apr. 28, 2015, 10 Pages.

Mitsubishi Heavy Industries, Ltd., Notice of Grounds for Rejection, Korean Application No. 2015-7026692, Filed Sep. 25, 2015, 9 Pages.

Nippon Kogaku, Decision to Grant a Patent, Japanese Application No. 2014-042073, dated Jan. 26, 2016, 3 Pages. Statement of relevance, "The Decision to Grant a Patent has been received."

First Office Action, App. No. 201580000467.9, dated Mar. 29, 2016, 9 Pages.

Decision for Grant of Patent, App. No. 2015-7026692, dated May 2, 2009, 3 Pages.

Decision to Grant a Patent, Japanese App. No. 2014-042073, dated Jan. 26, 2016, 3 Pages. Statement of relevance, "The Decision to Grant a Patent has been received."

Extended EP Search Report, App. No. 15759319.5, dated Jun. 17, 2016, 6 Pages.

Notice of Granting a Patent Right for Invention, Chinese App. No. 201580000467.9, dated Sep. 8, 2016, 2 Pages.

\* cited by examiner

METHOD OF MANUFACTURING TURBOCHARGER AND TURBOCHARGER

TECHNICAL FIELD

The present invention relates to a method of manufacturing a turbocharger and a turbocharger.

BACKGROUND

In the related art, a turbocharger which compresses air of an internal combustion engine and feeds air having high density to a combustion chamber is known, and for example, the turbocharger is widely used in a two-stroke low-speed engine such as a marine diesel engine or a diesel engine for generating power. In the turbocharger, a compressor which compresses combustion air and a turbine serving as a drive source of the compressor are coaxially connected to each other, and the compressor and the turbine are accommodated in a casing and are integrally rotated. In addition, the turbocharger turbine is driven by energy held in exhaust gas of an internal combustion engine.

As the above-described turbocharger, a hybrid turbocharger in which a high-speed motor generator is connected to a rotor shaft is known. Similarly to a general turbocharger, the hybrid turbocharger can supply pressurized combustion air to an internal combustion engine and generate electricity using excess exhaust gas energy to supply power. In addition, when a motor generator of a hybrid turbocharger is installed inside a silencer of a compressor side, in general, the hybrid turbocharger has a size capable of approximately penetrating the silencer.

In addition, an electric assist turbocharger is known, in which a miniaturized motor is adopted instead of the motor generator of the above-described hybrid turbocharger and the motor is housed in the turbocharger. In the electric assist turbocharger, the miniaturized motor is attached to a shaft extension portion in which a rotor shaft extends in an inlet air passage side. In this case, since a size of the motor is small, it is possible to sufficiently support a weight of the motor rotor by the existing bearings of the turbocharger. Accordingly, in general, a structure in which a dedicated bearing for a motor is not required, that is, a motor overhang structure which does not have a dedicated bearing for a motor is adopted. In the electric assist turbocharger, for example, when a sufficient amount of exhaust gas cannot be obtained during a low load of a main engine, the motor is used to assist turbocharger's compression by consuming electricity to supply enough scavenging pressure to the main engine in place of an auxiliary blower.

Moreover, Japanese Unexamined Patent Application Publication No. 2013-24059, for example, discloses an electric supercharging compressor including rolling bearings which are provided on both sides of an electric motor and support a rotary shaft, and an assembly method thereof.

DESCRIPTION OF EMBODIMENTS

However, the motor of the above-described electric assist turbocharger adopts the motor overhang structure which does not have a bearing. In the case of the motor overhang structure, since a motor rotor of a miniaturized motor is attached to an extension portion of a rotor shaft, it is not necessary to install a dedicated bearing on the motor rotor, and the motor rotor is supported by bearings (bearing of the rotor shaft) supported by a turbocharger main body.

In addition, like the above-described hybrid turbocharger or the like, it is possible to use a structure in which a motor has a dedicated bearing. However, in this structure, a structure which allows lubricating oil to circulate through a bearing portion is required, and it is necessary to newly install a lubricating oil pipe and a compression air pipe for oil distribution. In addition, since each of the turbocharger and the motor has a bearing, a diaphragm coupling is required in order to absorb axial displacement and radial misalignment between the turbocharger and the motor, a cost increases, and it is difficult to perform retrofitting.

Accordingly, when the motor is assembled to the electric assist turbocharger, since a bearing is not provided on the motor, a stator and a motor rotor cannot be assembled to a motor as a single unit, and it is not possible to attach a unified motor structure as it is. Thus it is not possible to install a bearing-less motor as a unified unit unlike a motor having bearings installed as a unified unit with a coupling. As a result, it is necessary to sequentially assemble a motor rotor and a stator of a motor, and during assembly of a turbocharger, if other metal members approach a motor rotor having a strong permanent magnet at a predetermined assembly position, there is a problem that the metal members may stick on the motor rotor by a magnetic force, and the metal members become fixed to the motor rotor or the motor rotor may be damaged.

From the above-described circumstance, in a turbocharger such as the electric assist turbocharger in which the motor overhang structure is adopted, it is desirable to provide measures (manufacturing method) for solving problems generated when the motor rotor and the stator are sequentially assembled and for easily performing an assembly operation. Embodiments solve the above-described problems, and an object thereof is to provide a method of manufacturing a turbocharger capable of easily performing an operation of sequentially assembling a motor rotor and a stator in a turbocharger in which a motor overhang structure is adopted, and a turbocharger which is assembled according to the method of manufacturing.

Embodiments adopt the following approaches in order to solve the above-described problems. According to a first embodiment, there is provided a method of manufacturing a turbocharger in which a motor is attached to an end portion of a rotor shaft connected to a compressor portion, the motor including a cylindrical housing, a stator accommodated inside the housing, and a motor rotor which is connected to an end portion of the rotor shaft and includes a permanent magnet rotating inside the stator, the method including: a rotor installation step of connecting and attaching the motor rotor to the rotor shaft; a housing installation step of coaxially fixing and supporting the housing to the rotor shaft; and a stator installation step of guiding the housing, and inserting the stator into the housing such that the stator does not directly come into contact with the motor rotor to incorporate the stator into the housing.

In the method of manufacturing a turbocharger according to the first aspect, since the rotor installation step of connecting and attaching the motor rotor to the rotor shaft, the housing installation step of coaxially fixing and supporting the housing to the rotor shaft, and the stator installation step of guiding the housing, and inserting the stator into the housing such that the stator does not directly come into contact with the motor rotor to incorporate the stator into the housing are provided, when the stator is inserted into the housing, the stator having approximately the same diameter as the cylindrical housing is inserted into the housing along an inner wall surface of the cylindrical housing. Accordingly, it is possible to prevent the stator from being pulled toward the permanent magnet of the motor rotor, coming into contact with the permanent magnet, and becoming fixed to the permanent magnet.

In the first aspect, preferably, in the rotor installation step, a protection tube is provided on the motor rotor. Accordingly, in the housing installation step or the stator installation step, it is possible to prevent the housing, the stator, or the like from coming into contact with the motor rotor. In addition, preferably, the protection tube is formed of a material such as nylon which has a sliding property and does not have magnetism.

In the first aspect, preferably, a step of providing a concave groove portion on an inner circumferential surface of the housing is provided. Accordingly, a contact area between the inserted stator and the inner circumferential surface of the housing is decreased, and it is possible to reduce a generated friction force. In this instance, preferably, a step of chamfering corner portions of both end portions in an axial direction of the concave groove portion is provided. Accordingly, it is possible to smoothly insert the stator.

In the first aspect, preferably, a step of applying thermal grease for improving a heat transfer property to an inner wall surface of the housing is provided. Accordingly, heat transfer during an operation increases, and insertion of the stator becomes smoother.

In this case, preferably, grease discharging ports which extrude excess thermal grease are provided in the housing.

In the first aspect, preferably, in the housing installation step, multiple guide bars are used to position and slide the housing. By using the guide bars, it is possible to prevent a metal member such as a housing from being pulled toward a strong permanent magnet of the motor rotor, being fixed to the permanent magnet, and being damaged.

According to a second embodiment, there is provided a turbocharger including a motor which is attached according to the above-described method of manufacturing a turbocharger.

According to the turbocharger of the second aspect, since the motor attached according to the above-described method of manufacturing a turbocharger is provided, it is possible to easily manufacture the turbocharger without a metal member being pulled toward the motor rotor having a strong permanent magnet due to a magnetic force of the motor rotor.

Advantageous Effects of Particular Embodiments

According to the above-described aspects, in a turbocharger which adopts a motor overhang structure, since it is possible to prevent a metal component such as a stator from being pulled toward a strong permanent magnet, being fixed to the permanent magnet, and being damaged when a motor rotor and a stator are sequentially assembled to manufacture a motor, an easy assembly operation of a motor becomes possible. In the motor which adopts the motor overhang structure, since a bearing, which requires lubrication such as circulation of lubricating oil, is not needed, it is possible to easily perform retrofitting to the existing turbocharger and effectively reduce a cost.

Figure 9:
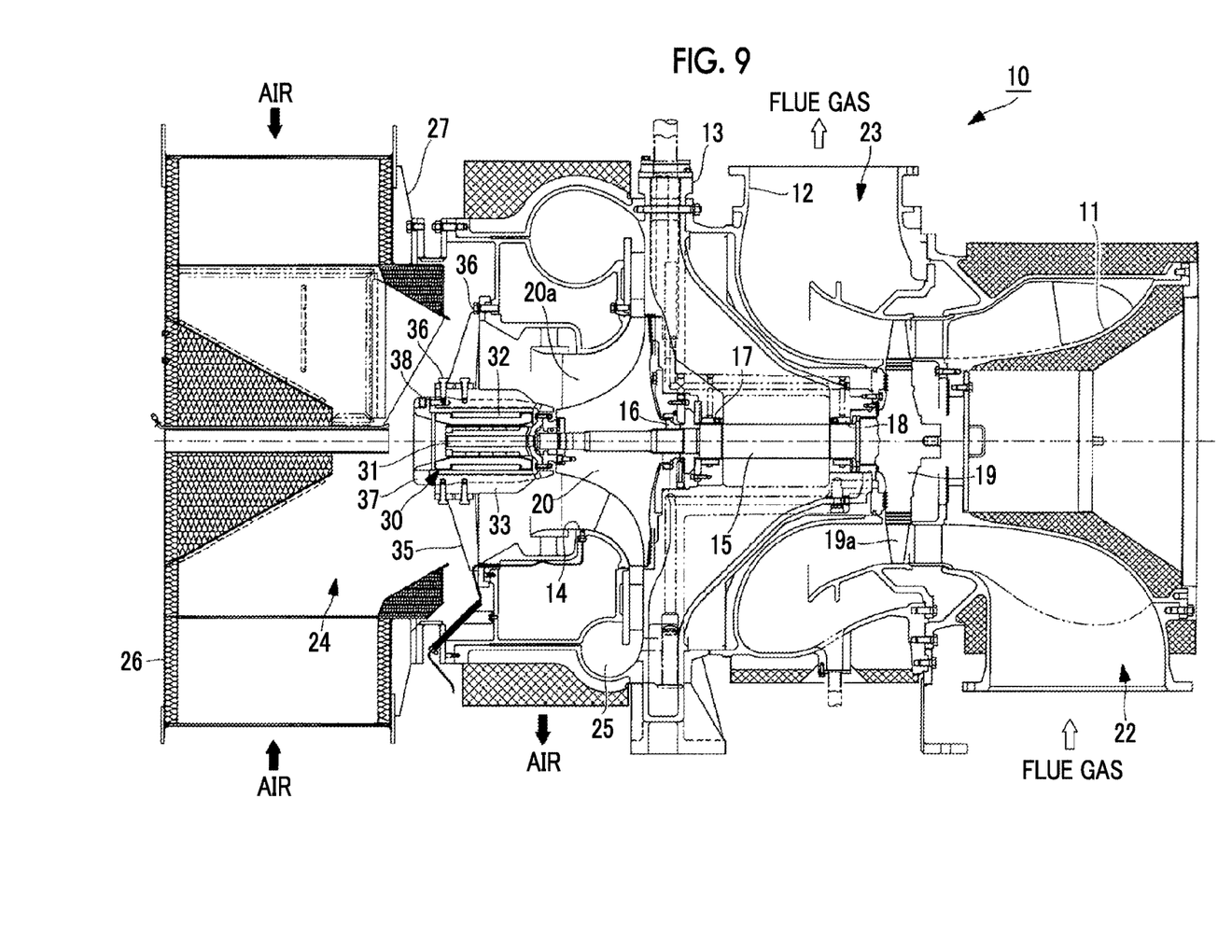
FIG. 9 is a vertical sectional view showing a schematic configuration example of the turbocharger according to an embodiment.

Hereinafter, embodiments with respect to a method of manufacturing a turbocharger and a turbocharger according to one or more embodiments will be described with reference to the drawings. FIG. 9 is a vertical sectional view showing a schematic configuration example of an electric assist turbocharger as an example of the turbocharger according to one or more embodiments. For example, an electric assist turbocharger (hereinafter, referred to as a "turbocharger") 10 shown in FIG. 9 is provided in a marine diesel engine (not shown) (for example, a low-speed two cycle diesel engine), and is a device which supplies compressed air to an air supply manifold (not shown) which communicates with an inner portion of a cylinder liner (not shown) configuring a marine diesel engine.

As shown in FIG. 9, the turbocharger 10 of the present embodiment is configured by integrally connecting a gas inlet casing 11, a gas outlet casing 12, a bearing pedestal 13, and an air guide casing 14 of a compressor side by bolts (not shown). A rotor shaft 15 is rotatably supported by a thrust bearing 16 and journal bearings 17 and 18 which are provided inside the bearing pedestal 13, and includes a turbine 19 configuring a turbine portion on one end portion and a compressor impeller (impeller) 20 configuring a compressor portion on the other end.

The turbine 19 includes multiple blades 19a on an outer circumferential portion of the turbine. The blades 19a are disposed between an exhaust gas introduction passage 22 which is provided in the gas inlet casing 11, and a exhaust gas discharge passage 23 which is provided in the gas outlet casing 12. Meanwhile, the compressor impeller 20 includes multiple blades 20a on an outer circumferential portion of the compressor impeller. The blades 20a are disposed on a downstream side of an inlet air passage (intake channel) 24 provided in the air guide casing 14. The inlet air passage 24 is connected to a scroll chamber 25 via a compressor impeller 20, and the scroll chamber 25 is connected to a combustion chamber of an engine via an inlet air passage (not shown).

In addition, the above-described turbocharger 10 includes a silencer 26 on the upstream side of the inlet air passage 24. The silencer 26 is installed in upstream of the inlet air passage 24, that is, air passes through the silencer 26 before the inlet air passage 24 and air compression. It works as a filter by straightening the passing air and a noise absorber. The silencer 26 is supported by the air guide casing 14 via an intermediate piece 27.

Moreover, the turbocharger 10 of the present embodiment includes a motor 30 which is connected to the rotor shaft 15. In the motor 30, a power generation function of a motor generator which is used in a hybrid turbocharger is omitted, and only an electric motoring function is performed. Accordingly, the motor 30 is miniaturized. Therefore, the motor 30 has a structure in which the rotor shaft 15 extends to the inlet air passage 24 side so as to attach the motor, that is, has a motor overhang structure in which the motor 30 does not have a dedicated bearing. Accordingly, the motor 30 and the motor rotor 31 described below of the motor 30 are supported by the thrust bearing 16 and the journal bearings 17 and 18 which support the rotor shaft 15.

Figure 10:
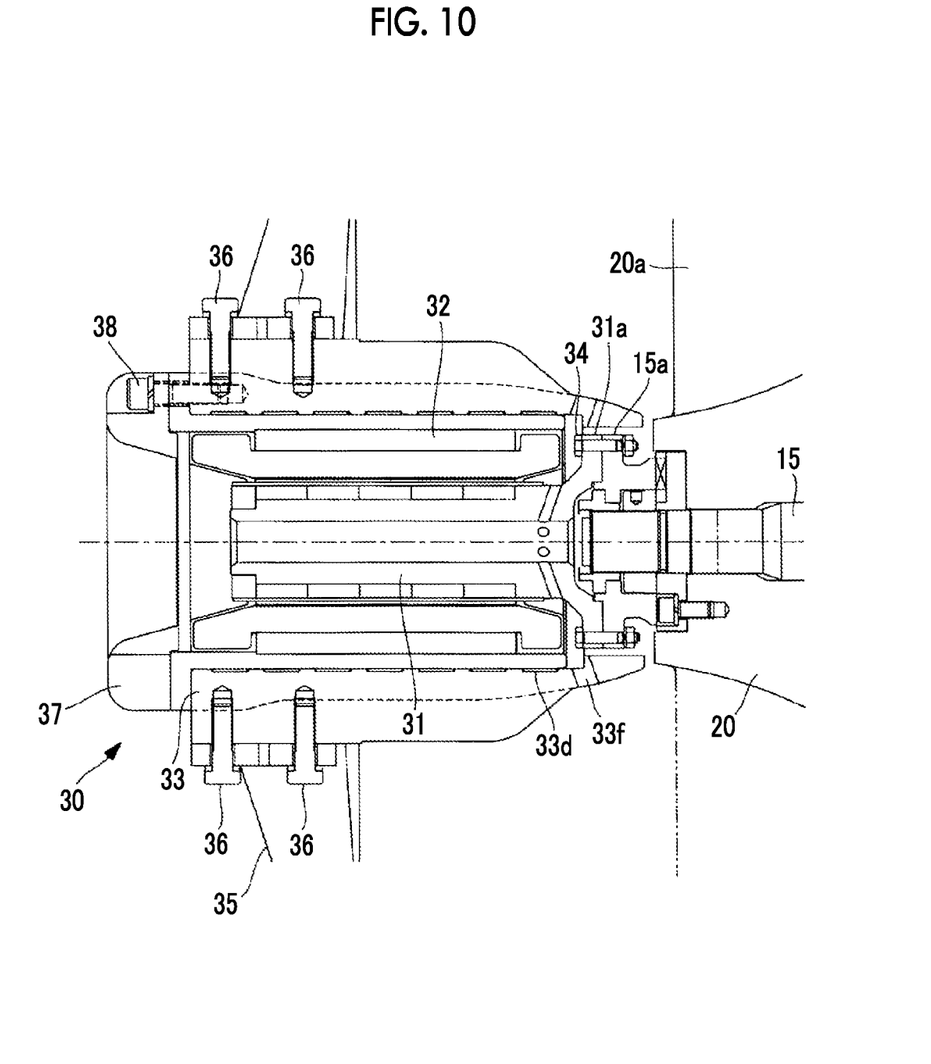
FIG. 10 is an enlarged view in the vicinity of the motor of the turbocharger shown in FIG. 9.

FIG. 10 is an enlarged view in the vicinity of the above-described motor 30. The motor 30 has the motor rotor 31, a stator 32, and a housing 33 as main components. Among these, the motor rotor 31 is a columnar member which includes a permanent magnet on the outer circumferential surface, and one end portion of the motor rotor is connected to an end portion of the rotor shaft 15 by a flange connection. In the flange connection, a flange 31a provided on an end portion of the rotor shaft 15 which is positioned on the inlet air passage 24 side, and a flange 15a provided an end portion of the motor rotor 31 which is positioned on the compressor impeller 20 side are joined to each other, and the flanges 31a and the flange 15a are connected to each other using a plurality of bolts and nuts 34.

The stator 32 is installed so as to be accommodated in the cylindrical housing 33. As shown in FIG. 9, the housing 33 is supported by the air guide casing 14 via a support member 35. In addition, the support member 35 and the air guide casing 14 are connected to each other by a hexagon head bolt 36, and the support member 35 and the housing 33 are connected to each other by a hexagon head bolt 36.

The motor rotor 31 passing an axial center portion of the stator 32 is disposed in a hollow portion of the stator 32 in a state where the motor rotor 31 does not come into contact with the stator 32. In addition, a cap 37 is attached so as to be fixed to an end portion of the housing 33, which is positioned on the inlet air passage 24 side, by a hexagon socket head bolt 38. The cap 37 is positioned further toward the compressor impeller 20 side than the silencer 26. That is, the size of the motor 30 is reduced until a shaft extension portion of the rotor shaft 15 does not reach the silencer 26.

Figure 1:
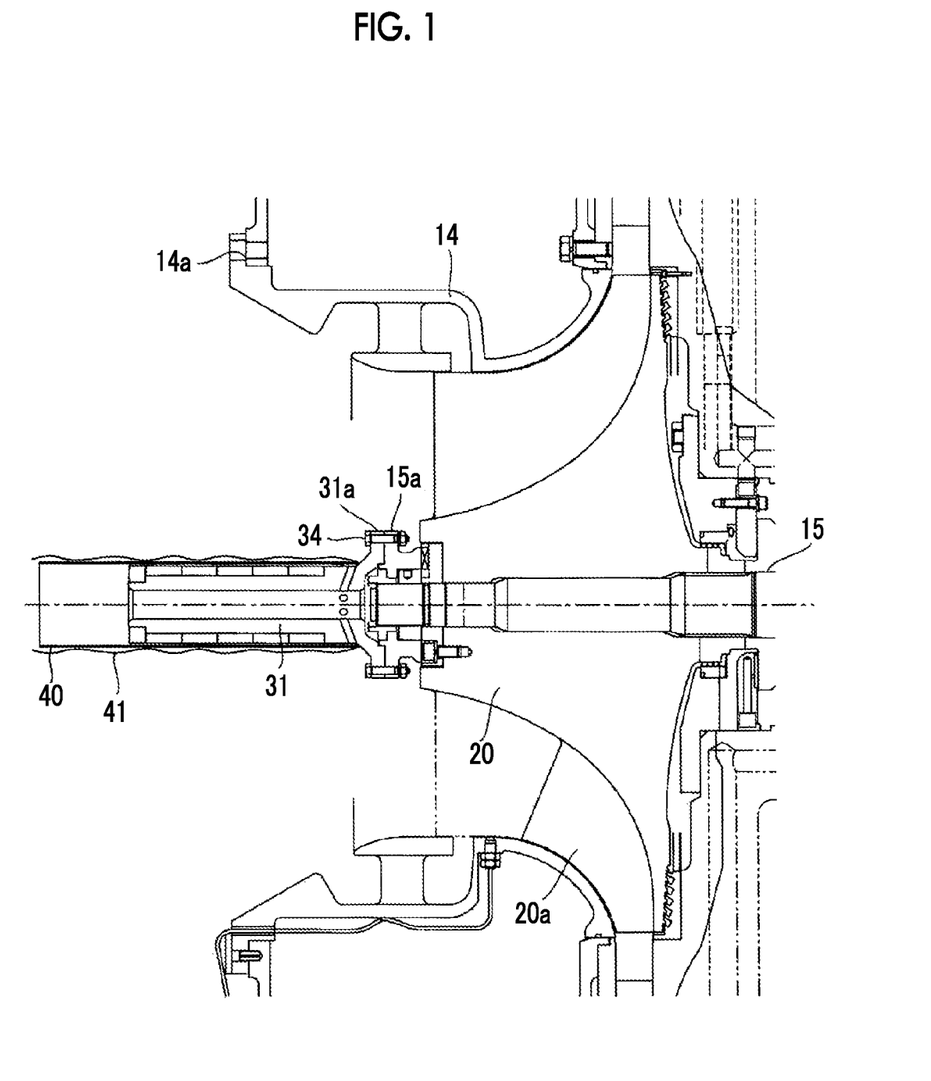
FIG. 1 is a sectional view of a main portion in the vicinity of a motor showing a first step in assembly of the motor in an embodiment of a method of manufacturing a turbocharger and a turbocharger according to an embodiment.

Hereinafter, a manufacturing procedure (manufacturing method) of assembling the motor 30 to the turbocharger 10 having the above-described configuration will be described with reference to FIGS. 1 to 8. FIG. 1 shows a first step in assembly of the motor, and is a sectional view of a main portion showing a rotor installation step of connecting and attaching the motor rotor 31 to the rotor shaft 15. In the first step, after assembly of the compressor impeller 20 is completed, an operation of connecting a motor rotor 31 to an end portion of the rotor shaft 15 using a flange connection and mounting a protection tube 40 on an outer circumferential side of the motor rotor 31 is performed. In addition, when the first step starts, in order to secure workability when the motor rotor 31 is connected to the end portion of the rotor shaft 15 using a flange connection, the connection may be performed in a state where the air guide casing 14 is not attached.

In the flange connection between the rotor shaft 15 and the motor rotor 31, after the flanges 15a and 31a are joined to each other in a predetermined state, the rotor shaft 15 and the motor rotor 31 are connected to each other using the plurality of bolts and nuts 34. In this way, after the motor rotor 31 is connected to the rotor shaft 15, in order to easily perform an operation of the subsequent step, the protection tube 40 is mounted on the rotor motor 31. Preferably, the protection tube 40 is made from a material which has a sliding property and does not have magnetism, and a plastic-based material such as nylon or polyethylene may be used for the protection tube 40. As an example of a suitable material, for example, nylon (polyamide resin) equivalent to MC901 (Product Name) can be used. Moreover, the protection tube 40 has a length by which the motor rotor 31 is completely accommodated and in which the protection tube 40 protrudes in a direction of the silencer 26 from an end of the silencer 26 side of the housing 33 assembled at a predetermined position in a second step described below.

In addition, preferably, in order to protect the motor rotor when a tool or a bolt is attracted to a magnet portion of the motor rotor and comes into contact with the magnet portion during an operation, for example, a belt-like member 41 such as nylon is wound outside the protection tube 40. In addition, after the motor rotor 31 is connected to the rotor shaft 15, the guide casing 41 may be fixed at a predetermined position.

Figure 2:
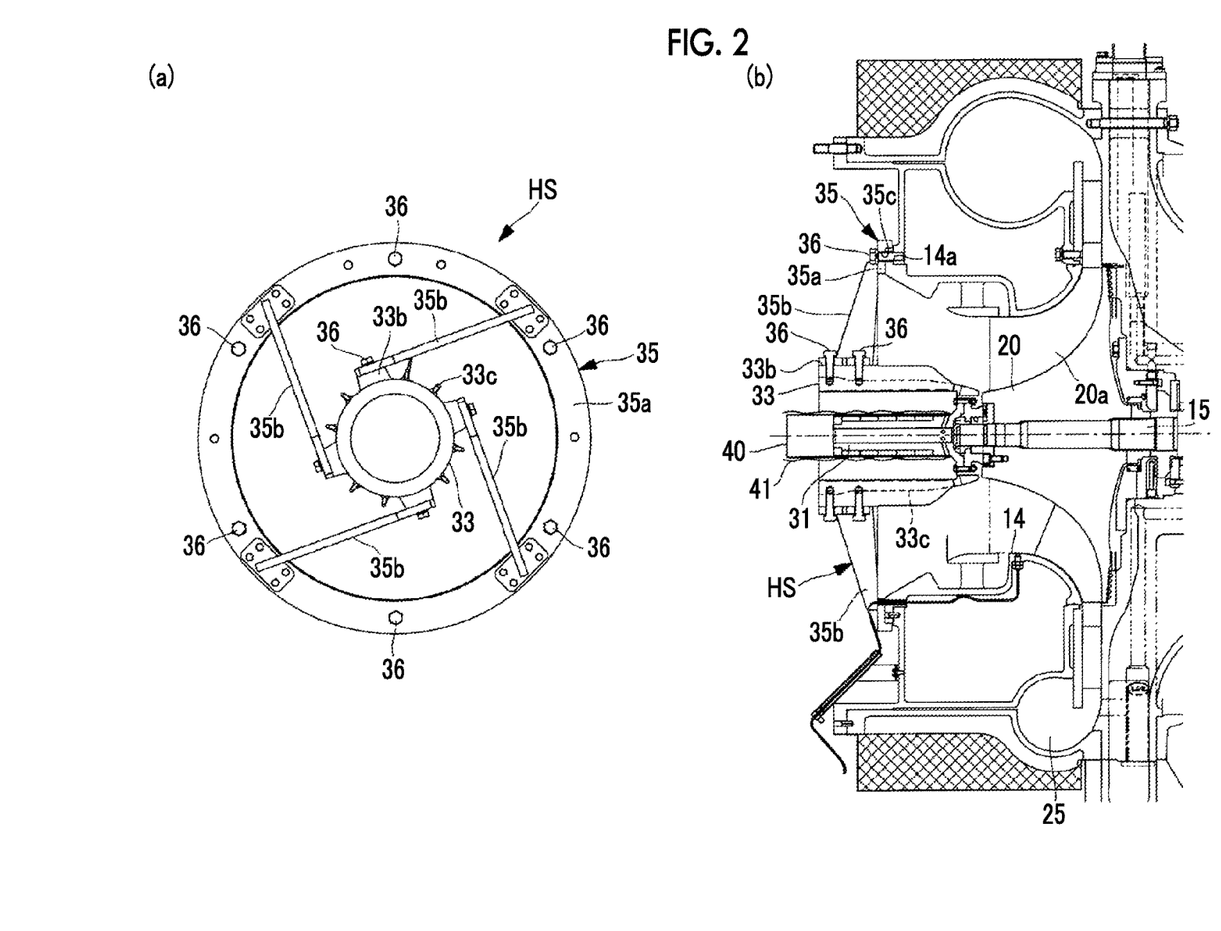
FIG. 2 is a view showing a second step in assembly of the motor, (a) is a side view of a main portion of a silencer for the turbocharger when viewed from an attachment direction of the silencer (left-side view of FIG. 2(b)), and (b) is a sectional view of a main portion in the vicinity of the motor.

FIG. 2 is a view showing the second step in assembly of the motor and a housing installation step in which the housing 33 is supported so as to be coaxially fixed to the rotor shaft 15, FIG. 2(*a*) is a side view of a main portion when viewed from an attachment direction of the silencer 26 (left-side view of FIG. 2(*b*)), and FIG. 2(*b*) is a sectional view of a main portion in the vicinity of the motor. The second step is a step before the stator 32 is assembled, and a stator support unit HS which is integrated by connecting the housing 33 and the support member 35 to each other is attached at a predetermined position on the air guide casing 14 so as to be coaxial with the shaft center of the rotor shaft 15.

The support member 35 is configured to include a ring-shaped flanged portion 35a and a plurality of (four in the present embodiment) connection bars 35b. The flanged portion 35a is fixed to the air guide casing 14 by a hexagon head bolt 36, and in the flanged portion 35a, a plurality of (six in the present embodiment) bolt holes 35c are provided at an equal pitch in a circumferential direction of the flanged portion 35a. Each of the connection bars 35b is a member which connects the flanged portion 35a and the outer circumferential portion of the housing 33, and has a function which holds the housing 33 at an axial center position of the flanged portion 35a.

Figure 3:
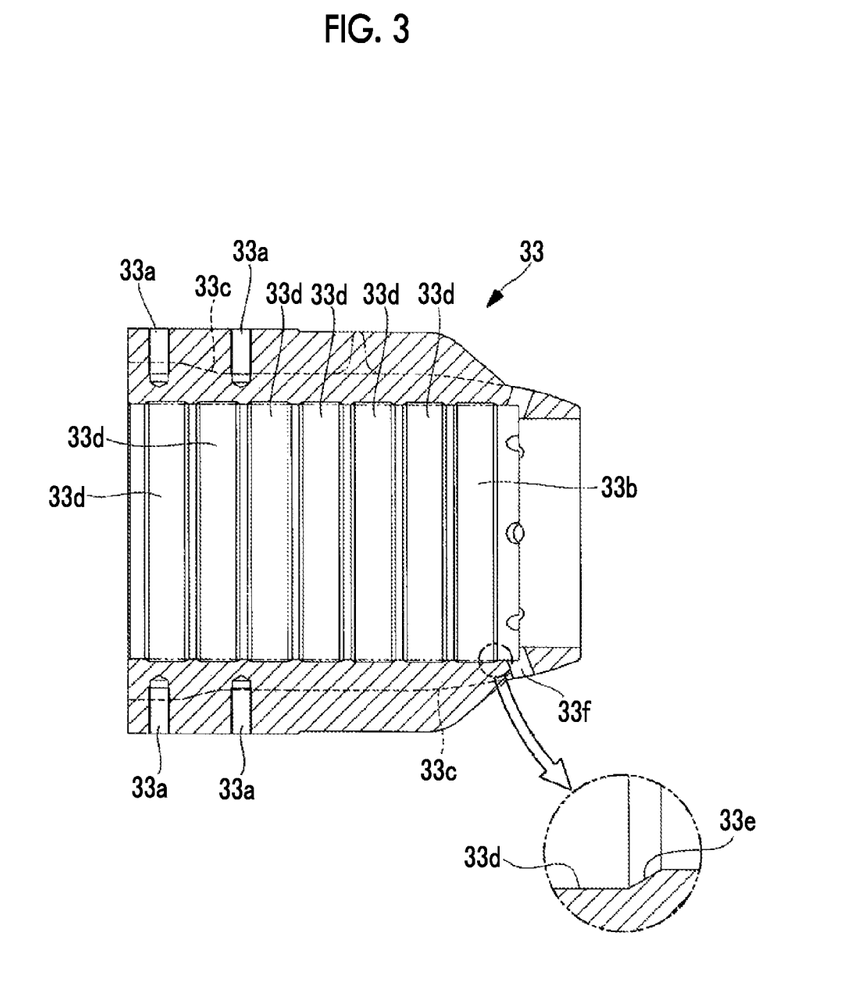
FIG. 3 is a vertical sectional view showing an example of a housing structure of the motor.

FIG. 3 is a sectional view showing the housing 33. The housing 33 is a cylindrical member, and pedestals 33b including blot holes 33a through which one end portion side of the connection bar 35b is fixed to the housing 33, and heat radiating fins 33c are provided on the outer circumferential surface of the housing 33. Meanwhile, a plurality of (seven rows in the present embodiment) concave groove portions 33d are provided in an axial direction over the entire circumference on an inner wall surface of the housing 33. In addition, in each of the concave groove portions 33d, in order to prevent the stator 32 from colliding with a corner portion of the concave groove portions 33d when the stator 32 is incorporated, inclined surfaces 33e are provided by chamfering the corner portions on both end portions in the axial direction.

By providing the above-described concave groove portions 33d, when the stator 32 described below is inserted and incorporated, since an area between the stator 32 and the inner wall surface of the housing 33 coming into contact with the stator 32 decreases, the stator 32 can be easily inserted into the housing 33 due to reduction of a friction force. In addition, in the second step in assembly of the motor, thermal grease is thinly applied to the inner wall surface of the housing 33, that is, on the entire surface of the inner wall surface of the housing 33 including the concave groove portions 33d. The thermal grease contributes to improvement of heat transfer during an operation, and in the step of incorporating the stator 32, also contributes to improved sliding and smooth insertion of the stator 32. Moreover, a reference numeral 33f indicates a grease discharging port through which excess thermal grease is extruded and discharged.

Figure 4:
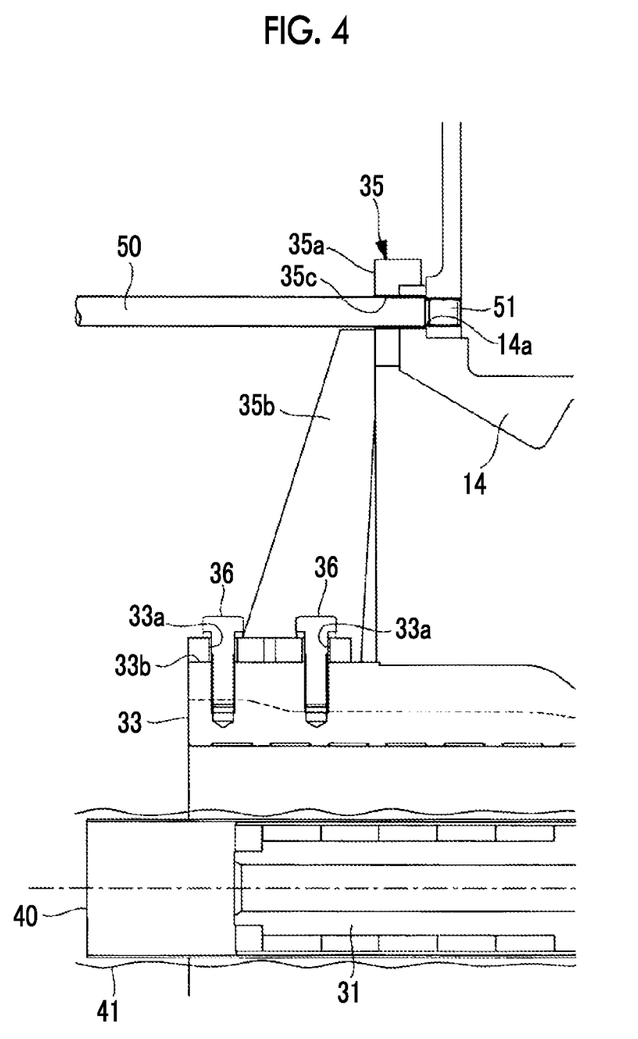
FIG. 4 is a sectional view of a main portion showing a method of attaching a stator support unit using a guide bar.

When the stator support unit HS configured as above is attached to the air guide casing 14, a metal member is pulled toward a strong permanent magnet of the motor rotor 31, and there is a concern that the metal member may stick and become fixed to the motor rotor 31, or may be damaged. Accordingly, for example, as shown in FIG. 4, as a tool having a positioning function and a sliding guide function, a guide bar 50 is used. That is, the housing installation step, multiple guide bars 50 are used for positioning and sliding of the housing 33. Each of the guide bars 50 is a rod-shaped member which includes a screw portion 51 having the same diameter as that of a hexagon head bolt 36 which fixes the flanged portion 35a to the air guide casing 14, on one end of the guide bar 50, and is used so that the screw portion 51 is screwed into a bolt hole 14a of the air guide casing 14 into which the hexagon head bolt 36 is screwed. In addition, in the state where the guide bar 50 is attached to the air guide casing 14, the guide bar 50 has a sufficient length by which a tip portion of the guide bar 50 opposite to the screw portion 51 is not affected by a magnetic force of the permanent magnet of the motor rotor 31.

In assembly of the stator support unit HS using the guide bar 50, as an initial preparation step, the plurality of guide bars 50 are screwed into the bolt holes 14a so as to be attached. In this case, if two guide bars are attached by bolt holes 14a positioned at two locations above and below each other, stable positioning and sliding of the stator support unit HS can be obtained. However, if three or more guide bars 50 are used, the positioning and sliding of the state support unit HS can be more stable. After installation of the guide bars 50 are completed, the stator support unit HS is suspended using an eyebolt (not shown) which is provided at an appropriate position, tip portions of the guide bars 50 are inserted into bolt holes 35c of the flanged portion 35a, and the guide bars 50 are positioned. Thereafter, the stator support units HS slides along the guide bars 50 and moves to an installation surface of the air guide casing 14. In this case, even when the stator support unit HS approaches the motor rotor 31 and receives a magnetic force, since the stator support unit HS is held by the guide bars 50, the stator support unit HS cannot be pulled toward the motor rotor 31.

In this way, in the stator support unit HS which has moved to a predetermined attachment position, hexagon head bolts 36 are sequentially screwed into the bolt holes 35c and 14a into which the guide bars 50 are not screwed, and the stator support unit HS is temporarily fixed. Thereafter, the guide bars 50 are disassembled, the hexagon head bolts 36 are screwed into the bolt holes 35c and 14a, all hexagon head bolts 36 are tightened by a predetermined amount, and fixing with respect to the stator support unit HS is completed. As a result, the stator support unit HS is positioned at the center of the flanged portion 35a and at a position at which the housing 33 coincides with the shaft center of the rotor shaft 15.

Figure 5:
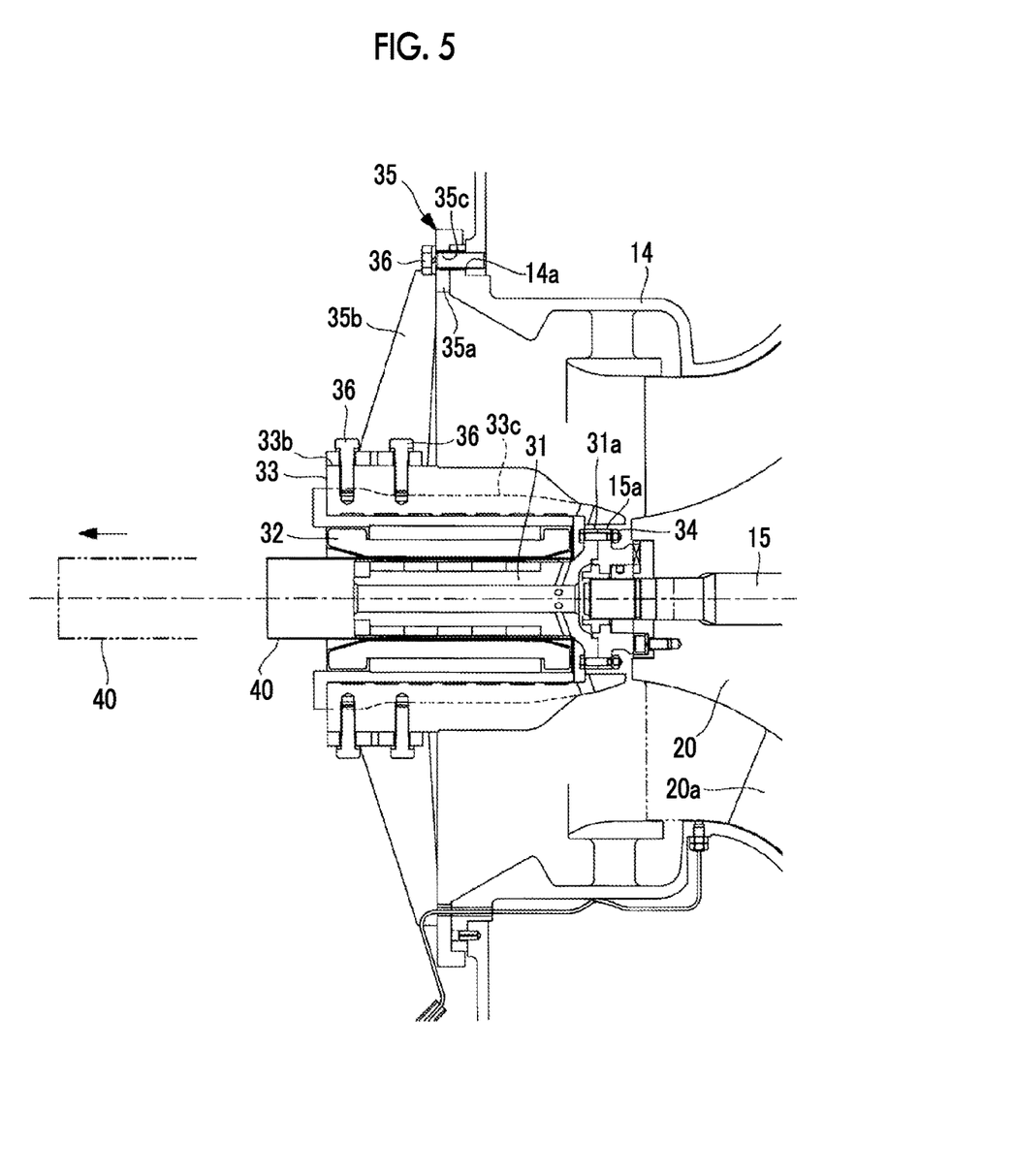
FIG. 5 is a sectional view of a main portion in the vicinity of the motor showing a third step in assembly of the motor.

FIG. 5 shows a third step in assembly of the motor, and is a sectional view of a main portion showing a stator installation step of guiding the housing 33 and inserting the stator 32 into the housing 33 so as to be incorporated into the housing 33. In the third step, first, the belt-like member 41 wound around the outer circumference of the protection tube 40 is removed so that the belt-like member 41 does not interfere with the stator. Thereafter, the housing 33 is guided so as to be coaxial with the shaft center of the rotor shaft 15, and the stator 32 slides into the housing 33 so as to be incorporated into the housing 33. That is, since an inner diameter of the housing 33 and an outer diameter of the stator 32 are approximately the same as each other, the stator 32 is introduced and inserted into an inner surface of the housing 33 without being positionally deviated in a radial direction. In this case, since thermal grease is applied to the inner surface of the housing 33 and concave groove portions 33d for decreasing a friction force are provided, sliding is improved and smooth insertion can be realized.

In addition, since the protection tube 40 is mounted on the motor rotor 31, the inserted stator 32 and the motor rotor 31 do not come into contact with each other. Even when the stator 32 is pulled toward the motor rotor 31, it is possible to protect the motor rotor 31 from impact at the time of contact due to existence of the protection tube 40, and damage of the motor rotor 31 is prevented. In addition, since the stator 32 and the motor rotor 31 are separated from each other due to the plate thickness of the protection tube 40, it can prevent from the motor rotor 31 sticking to the stator 32 by magnet attraction. In this way, after the stator 32 is incorporated into the housing 33 at a predetermined position inside the housing 33, the protection tube 40 may be extracted from the outer circumference of the motor rotor 31 so as to be disassembled. In addition, in the motor 30, a predetermined gap is provided between the outer circumferential surface of the motor rotor 31 and the inner circumferential surface of the stator 32. Accordingly, by setting the thickness of the protection tube 40 so as to be less than the predetermined gap, it is possible to easily extract the stator 32 after the stator 32 is assembled.

Figure 6:
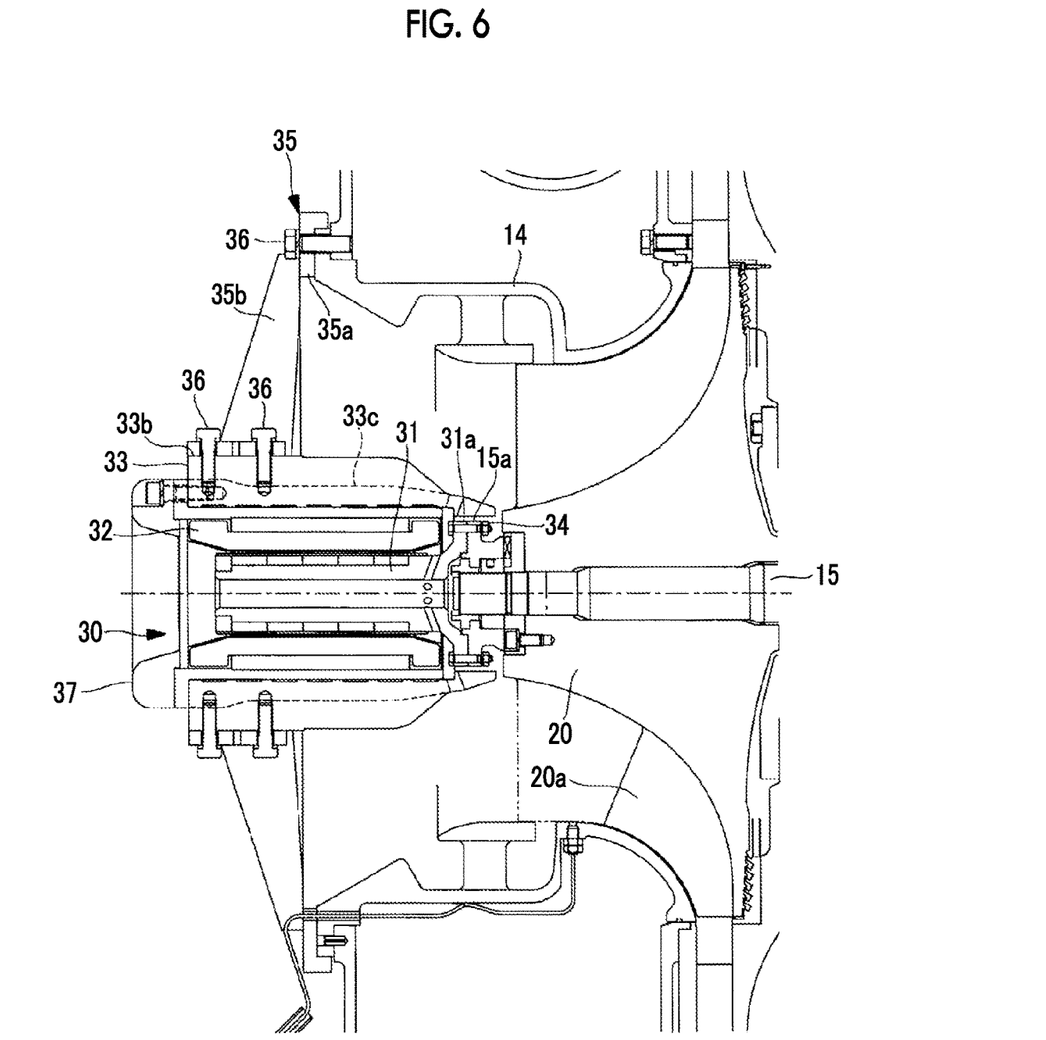
FIG. 6 is a sectional view of a main portion in the vicinity of the motor showing a fourth step in assembly of the motor.
Figure 7:
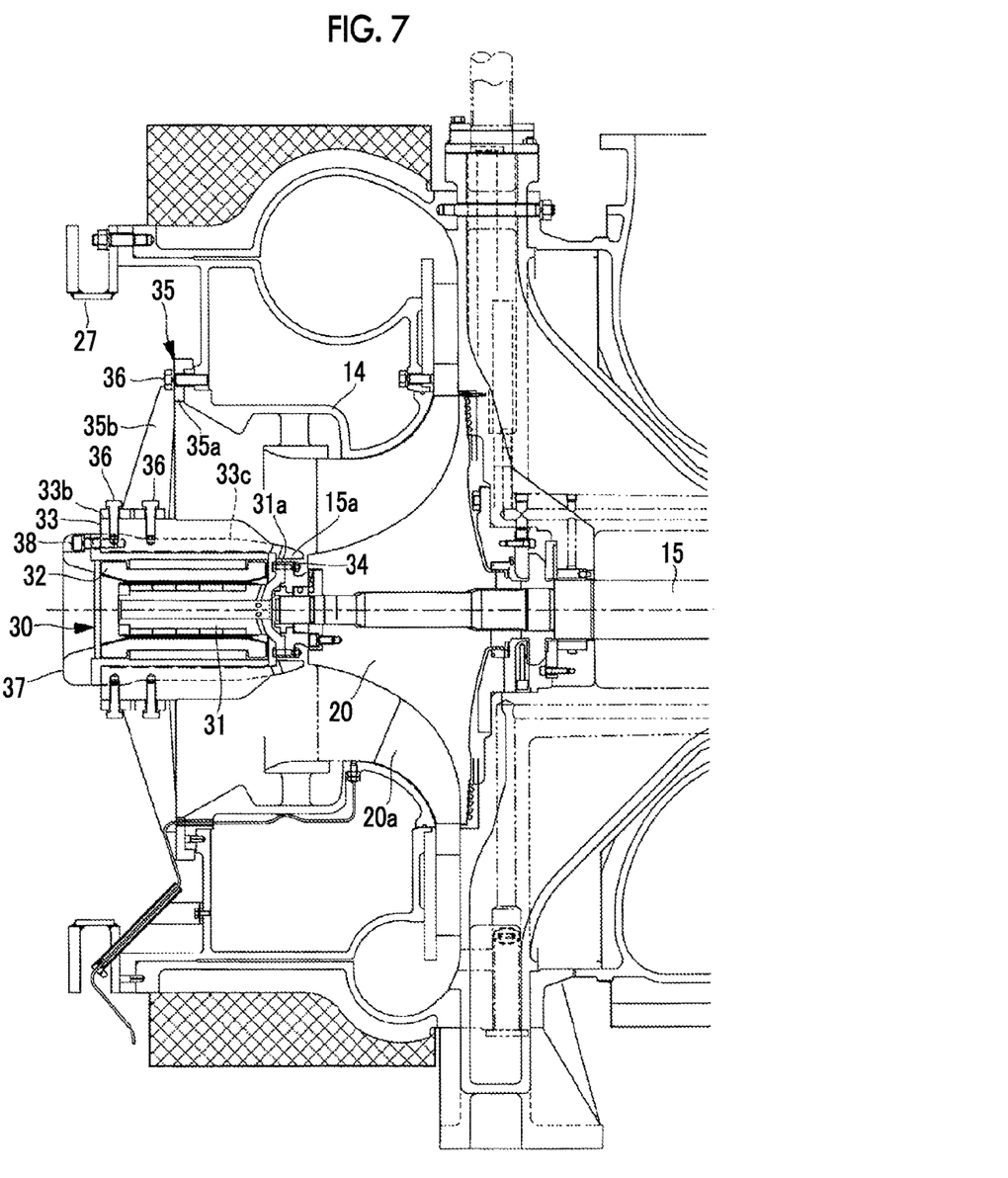
FIG. 7 is a sectional view of a main portion in the vicinity of the motor showing a state where an intermediate piece of the silencer for the turbocharger is attached after assembly of the motor is completed.
Figure 8:
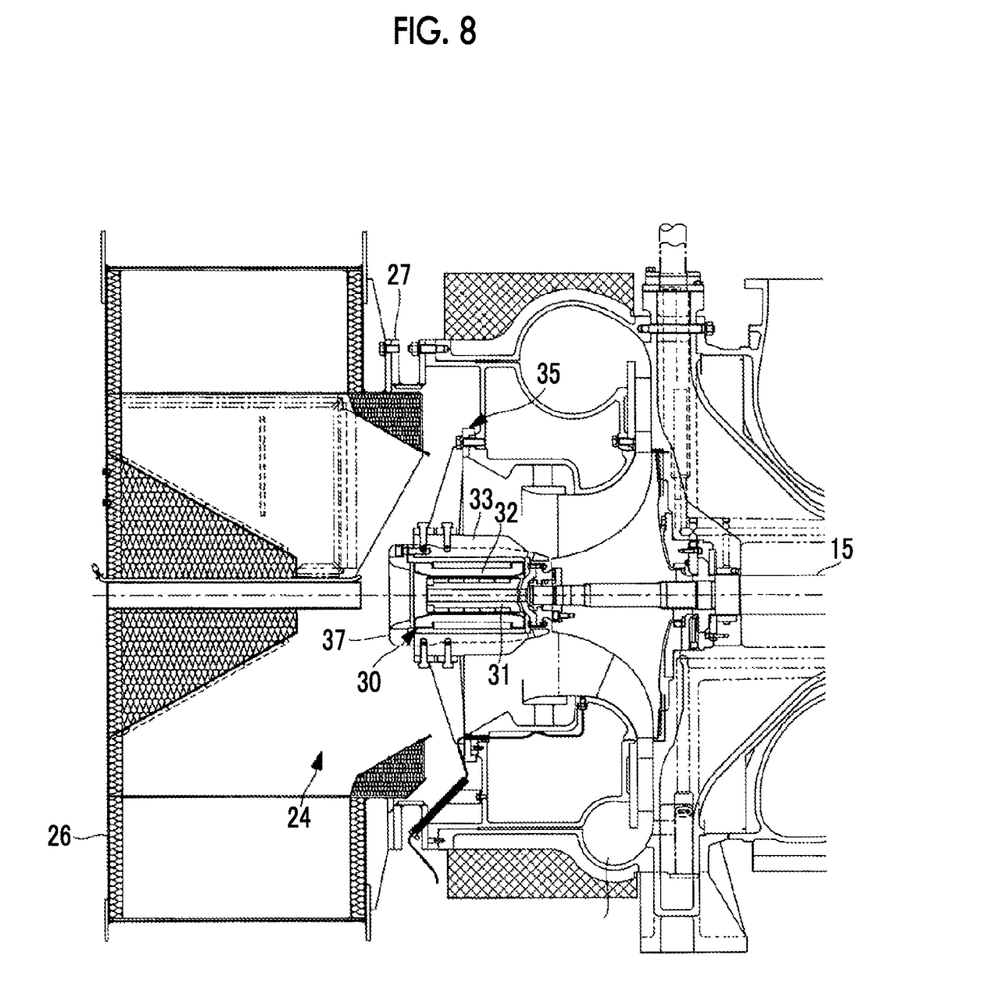
FIG. 8 is a sectional view of a main portion in the vicinity of the motor showing a state where the silencer for the turbocharger is attached to the intermediate piece of FIG. 7.

FIG. 6 is a sectional view of a main portion showing a fourth step in assembly of the motor. In the fourth step, a cap 37 is attached to the tip portion of the housing 33 into which the stator 32 has been inserted, and is fixed by a hexagon socket head bolt 38. As a result, the stator 32 is held at a predetermined position inside the housing 33, and assembly of the motor 30 is completed. In addition, for maintenance, when a step of disassembling the housing 33 is generated, it is possible to safely and simply disassemble the stator 32 and the motor rotor 31 according to an operation procedure reverse to the assembly procedure. Thereafter, as shown in FIGS. 7 and 8, attachment of the silencer 26 is performed. In FIG. 7, the intermediate piece 27 to which the silencer 26 is attached is attached to the air guide casing 14, and in FIG. 8, the silencer 26 is attached to the intermediate piece 27. In addition, before the silencer 26 is attached to the intermediate piece 27, accessory wires of the motor 30 side are bundled so as to be inserted into a predetermined wire passage.

According to the above-described embodiment, in the turbocharger 10 which adopts the motor overhang structure, at the time of the assembly of the motor 30 in which the motor rotor 31 and the stator 32 are sequentially assembled, it is possible to prevent the metal components such as the stator 32 from being pulled toward a permanent magnet, and as a result, an assembly operation of the motor 30 with respect to the rotor shaft 15 can be easily performed. In addition, in the motor 30 of the turbocharger 10 which adopts the motor overhang structure, a bearing which requires lubrication performed by lubricating oil is not needed. Accordingly, since lubricating oil is not required, it is possible to easily perform retrofitting to the existing turbocharger and easily reduce a cost. Moreover, embodiments are not limited to the above-described embodiment, and can be appropriately modified within a scope which does not depart from the gist.

The invention claimed is:

1. A method of manufacturing a turbocharger, comprising:
attaching a motor to an end portion of a rotor shaft, the rotor shaft being connected to a compressor portion, the motor including a cylindrical housing, a stator being accommodated inside the cylindrical housing, and a motor rotor which is connected to the end portion of the rotor shaft and includes permanent magnets rotatable inside the stator,
wherein the attaching the motor to the end portion of the rotor shaft comprises:
connecting, during rotor installation, the motor rotor to the end portion of the rotor shaft;
mounting a protection tube on an outer circumferential side of the motor rotor connected to the end portion of the rotor shaft, the protection tube comprising a nonmagnetic material, the protection tube further comprising a length sufficient to accommodate the motor rotor, a majority of the outer circumferential side of the motor rotor being accommodated by the protection tube;
fixing and supporting the cylindrical housing to a casing of the turbocharger so as to coaxially install the cylindrical housing to the rotor shaft to which the motor rotor is connected;
guiding and inserting the stator along an inner wall surface of the cylindrical housing between the motor rotor on which the protection tube is mounted and the cylindrical housing coaxially fixed to the rotor shaft, such that the stator does not directly come into contact with the motor rotor to incorporate the stator into the cylindrical housing; and
extracting the protection tube from the outer circumferential side of the motor rotor so as to be disassembled after the stator is incorporated between the motor rotor and the cylindrical housing.

2. The method of manufacturing the turbocharger according to claim 1, further comprising:
forming a concave groove portion on an inner circumferential surface of the cylindrical housing.

3. The method of manufacturing the turbocharger according to claim 2, further comprising:
chamfering corner portions of both end portions in an axial direction of the concave groove portion.

4. The method of manufacturing the turbocharger according to claim 1, further comprising: applying thermal grease to the inner wall surface of the cylindrical housing.

5. The method of manufacturing the turbocharger according to claim 4, further comprising:
providing a grease discharging port which extrudes excess thermal grease in the cylindrical housing.

6. The method of manufacturing the turbocharger according to claim 1, further comprising:
using a guide bar to position and slide the cylindrical housing during installation of the cylindrical housing.

* * * * *